G. B. Hamlin,
Cider Mill.
No. 106,359. Patented Aug. 16, 1870.
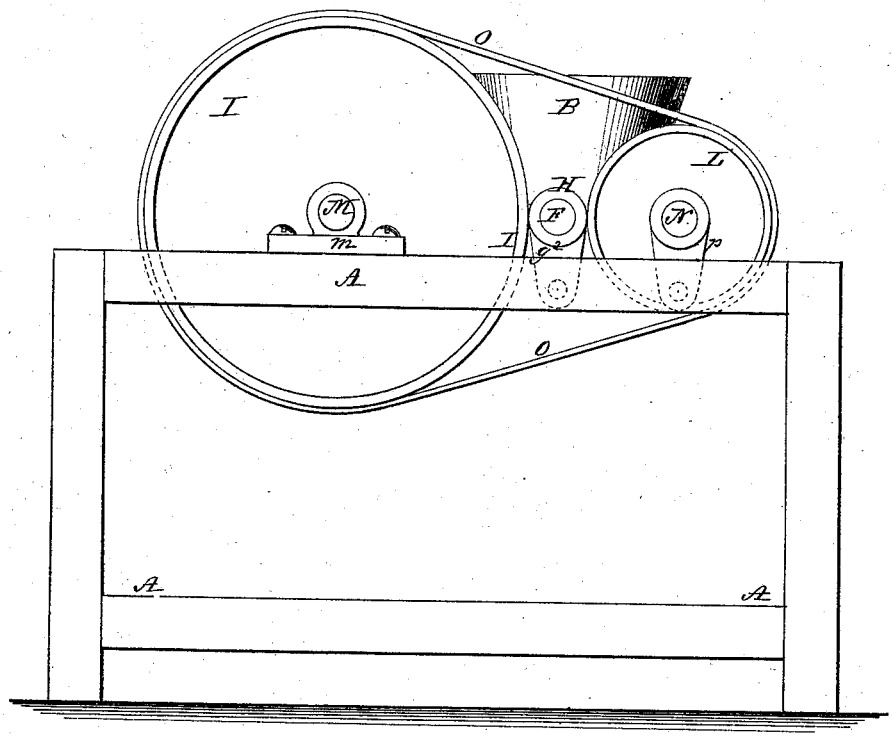
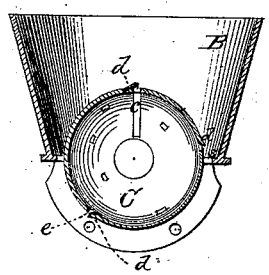

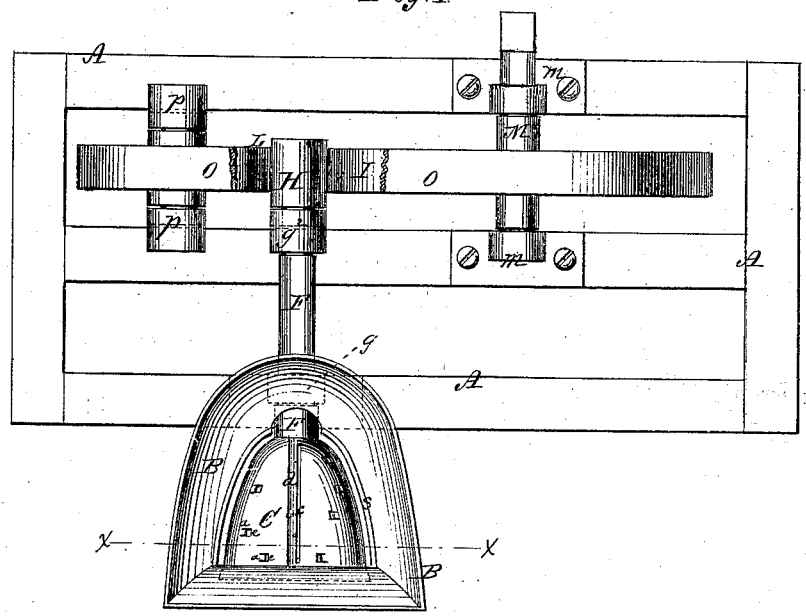
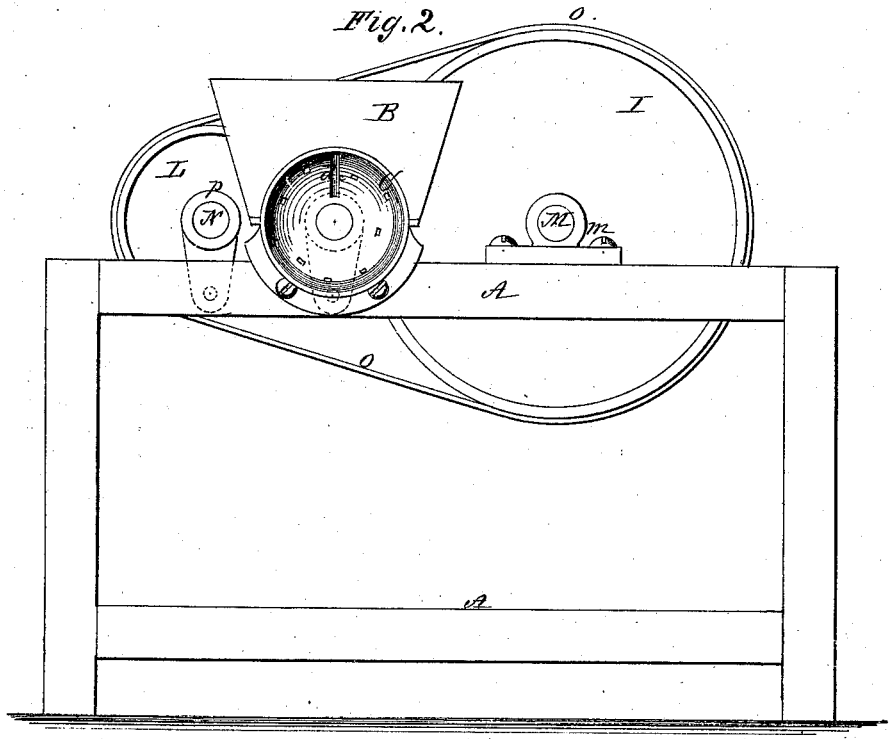

United States Patent Office.

GEORGE B. HAMLIN, OF WILLIMANTIC, CONNECTICUT.

Letters Patent No. 106,359, dated August 16, 1870.

IMPROVEMENT IN MACHINES FOR PREPARING APPLES FOR THE MANUFACTURE OF CIDER.

The Schedule referred to in these Letters Patent and making part of the same

*To all whom it may concern:*

Be it known that I, GEORGE B. HAMLIN, of Willimantic, in the county of Windham, in the State of Connecticut, have invented certain new and useful Improvements in Machinery for Cutting up Apples for Manufacture of Cider; and I do hereby declare that the following is a full and exact description thereof, reference being had to the accompanying drawing making part of this application.

My invention relates to certain new and useful improvements in machinery or apparatus for preparing the apples for the pressing operation in the manufacture of cider.

Previous to my invention a variety of machines known as "cider mills" have been made and used, in all of which the mode of operation has been that of crushing, breaking, or, as is commonly designated, "grinding" the apples. All such machines, and the mode of operation, or method of reducing the fruit to a comminuted condition, embody radical objections, the most obvious of which are the disadvantages which necessarily result from preparing the fruit for the press in broken pieces irregular in size and thickness from which it is difficult to extract the maximum quantity of juice, and the great expenditure of power necessary to work any machine in which this crushing operation has to be performed on the apples. The first-named objection is one of serious import, since it involves the question of economy of production, and the second is quite as, if not more serious, since, on account of this difficulty, it is impossible to have a cider-mill which can be successfully operated by hand-power—a great desideratum. I propose by my invention to overcome these and other serious objections which exist in all known machines and processes for preparing apples for the press in the manufacture of cider; and to this end My invention consists in a machine in which the apples are subjected to a cutting or shaving operation, and by means of which the fruit is all cut up into thin strips or slices in such a manner that all the juice can afterward be readily expressed.

To enable those skilled in the art to make and use my invention, I will proceed to describe it more fully, referring by letters to the accompanying drawing which illustrates a machine embracing it.

Figure 1 is a top view of such a machine;
Figure 2 is a side elevation of the same;
Figure 3 is a side elevation; and
Figure 4 is a detail section, at $x\ x$, fig. 1.

In the several figures the same part is designated by the same letter of reference.

A is a suitable frame-work on which is mounted the mechanism for preparing the fruit, or cutting it up ready for the pressing operation, and which also carries the driving-gearing or device for imparting the motive power to said mechanism.

B is the hopper for containing a supply of apples. It is mounted, as shown, on the frame A, and has arranged beneath it, or in its throat, the shaving and cutting cone C.

This cone has any desirable number of slots, $c$, which run from near its apex to near its base, and in each of which is arranged a knife-edge or cutting-blade, $d$, as clearly shown. Between these knives the surface of the cone C is provided or formed with numerous small openings, $e$, over each of which is a scraper or cutter, $a$.

I propose to make this cone of sheet metal, and form these openings and cutters (or graters) $e\ a$ by cutting through and upsetting the stock, as shown, (something after the fashion of a common grater, except that in lieu of a simple bur to scrape in any direction I make a sort of lip adapted to cut in one direction.)

The cone C is secured axially at its apex to one end of a shaft, F, which is mounted to turn freely in boxes or stands $g\ g^2$, and is provided at its other end with a friction-wheel, H, to which power and motion are imparted.

I is the main, and

L, an auxillary driving-wheel. These wheels are mounted respectively on the main shaft M and counter-shaft N, are banded together by a belt, O, and both run in contact with and mutually drive the wheel H.

The main shaft M is hung in stationary boxes $m\ m$, but the counter-shaft N, and the pulley end of shaft F, should be hung in yielding boxes, $p\ p$ and $g^2$, so that the friction driving may be kept in perfect adjustment.

The arrangement and operation of the devices composing the driving-gearing of the machine need not be more particularly described here. The apples to be prepared are put into the hopper B, which may be constantly supplied and kept full.

The motive power being applied to the main shaft M, a rapid rotary motion is imparted to the shaft F, and, consequently, to the cone C. As the latter rotates rapidly beneath the mass of fruit (in the hopper) resting on it, the knives $d$ cut off thin slices while the series of cutting-lips $a$ cut the apples at right angles to the direction of cut of knives $d$, and thus the fruit is thoroughly cut to pieces, and the shavings are discharged (mostly) from the interior of the cone C.

In a working machine I propose to have about four of the knives $d$, and a great many more of the cutting lips a, but the number and arrangement of the cutters does not, of course, affect the nature of my invention. It will be understood that a machine made on the principle herein described, and so that it will cut off thin shavings and strips from the fruit may be driven (especially with my improved system of driving gearing) successfully by hand-power, and a great quantity of work easily accomplished; and it will be seen that by cutting the apples up in the manner described, by shaving off thin slices and shreds the whole muscle portion of the apple is disintegrated, and the fruit is discharged from the machine in a much preferable condition for the extraction of the juice to that in which it leaves the ordinary mills, such as used previous to my invention. The details of construction, and the method of working the parts, may, of course, be varied without departing from the spirit of my invention, the gist of which is in the idea of cutting up the apples into small shreds in lieu of crushing them, as has heretofore been customary, whereby I am enabled not only to make a successful and economic hand-power machine, but can also prepare the fruit so that a greater quantity of juice can be extracted with the same facilities.

I have shown the rotary cone in combination with the hopper, as the most convenient form of machine, but my invention may, of course, be carried out by means of a differently shaped rotatory cutter-carrier, or even by a reciprocatory cutting mechanism working beneath the feed-hopper.

Having fully explained my invention, and the manner of carrying out the same, which I have found successful,

What I claim as new, and desire to secure by Letters Patent, is—

In a machine for preparing apples, the combination of a suitable hopper for holding a supply, with a series of continuous or knife-edged, and short interspersed cutters, arranged to operate substantially as and for the purposes described.

In testimony whereof I have hereunto set my hand and seal this 29th day of June, 1870.

GEORGE B. HAMLIN. [L. S.]

Witnesses:
   ISAAC M. FARMER,
   ISAAC W. SMITH.